3,072,653
5-AMINO DERIVATIVES OF 4-THIAZOLIDINONES AND PROCESS THEREFOR

Gerhard Satzinger, Memingen, Allgau, Germany, assignor to Warner-Lambert Pharmaceutical Company, Morris Plains, N.J., a corporation of Delaware
No Drawing. Filed Mar. 6, 1961, Ser. No. 93,320
12 Claims. (Cl. 260—247.1)

The present invention relates to new and novel 5-amino derivatives of 4-thiazolidinones of the formula:

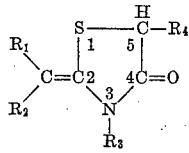

wherein $R_1$ is hydrogen, lower alkyl or aryl, $R_2$ is carbalkoxy in which the alkyl portion is lower alkyl, $R_3$ is lower alkyl and $R_4$ is di-lower alkylamino or a cyclic amino radical selected from the group consisting of piperidino, morpholino, pyrrolidino or mono-lower alkyl derivatives thereof. The present invention also relates to a new and novel method of preparing the above compounds and to new and novel intermediates obtained in the synthesis.

The term "lower alkyl" as used throughout the specification and in the claims refers to branched and straight chain aliphatic groups having 1 to 6 carbon atoms.

The new and novel 5-amino derivatives of 4-thiazolidinones of this invention have been found to have interesting pharmacological activity as analgesic, sedative, choleretic and diuretic agents. In use, they may be formulated with conventional pharmaceutical carriers to form such typical dosage units as tablets, capsules, solutions, suspensions, suppositories and the like.

It has now been found that the new and novel 5-amino derivatives of 4-thiazolidinones of this invention of the formula:

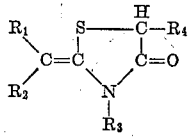

wherein $R_1$, $R_2$, $R_3$ and $R_4$ are as described hereinabove may be prepared by the following reaction sequence.

First, a substituted 4-thiazolidinone of the formula:

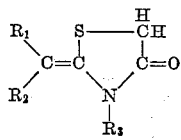

is treated with bromine to form the corresponding 5-bromo derivative of the formula:

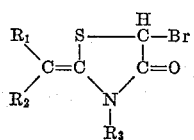

The reaction is carried out at normal room temperatures, for example about 25° C., in a suitable inert solvent such as chloroform. The bromine is preferably added slowly to the starting material as a solution in an inert solvent, for example chloroform. The 5-bromo derivative is recovered by evaporation of the solvent and may be purified by crystallization.

The 5-bromo compound is then converted to the new and novel 5-amino derivatives of this invention by reaction with an amine, as follows:

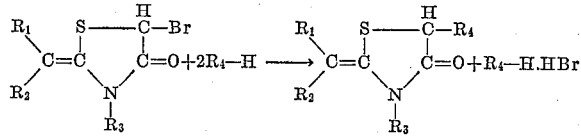

Useful amines included within the scope of the formula $R_4$—H are dimethylamine, diethylamine, dibutylamine, piperidine, morpholine, pyrrolidine, 2-methylpiperidine, 2-ethylpiperidine, 3-ethylmorpholine, 2-methylmorpholine, 3-methylmorpholine, 3-butylpyrrolidine, 2-methylpyrrolidine and the like. The reaction is normally carried out at room temperature in an appropriate inert solvent for the reactants, for example benzene, toluene and the like, with the preferred molar ratio of the reactants being 2 moles of the amine to 1 mole of the 5-bromo derivative. During the course of the reaction, the hydrobromide salt of the amine separates and is removed by filtration. The filtrate is then evaporated and the residue purified by crystallization. The final product may, if desired, be converted to a non-toxic acid addition salt, for example the hydrochloride, by treatment with an appropriate acid.

The starting materials for the preparation of the new and novel compounds of this invention, which starting materials have the formula:

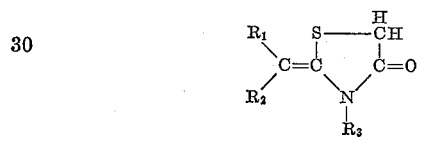

may be prepared as follows.

First, a substituted 4-thiazolidinone of the formula:

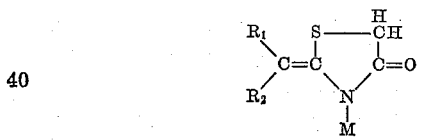

wherein M is an alkali metal and $R_1$ and $R_2$ are as described hereinabove is prepared by the reaction of a nitrile of the formula:

with a mercapto ester of the formula:

$$HS—CH_2—COOR'$$

wherein $R'$ is lower alkyl, in the presence of an aliphatic alcohol having 1 to 6 carbon atoms and an alkali metal as described in my application entitled "Substituted 4-Thiazolidinones and Process Therefor," application Serial No. 93,301, filed concurrently herewith.

The starting materials for use in the preparation of the compounds of this invention are then prepared from these substituted 4-thiazolidinones as follows:

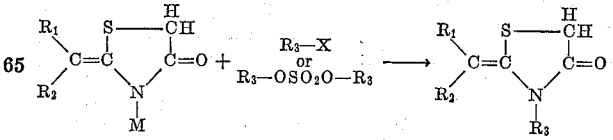

wherein X is halogen, as described in my application entitled "Substituted 4-Thiazolidinones and Process Therefor," application Serial No. 93,301, filed concurrently herewith.

The following examples are included in order further to illustrate the present invention:

EXAMPLE 1

2-Carbethoxymethylene-3-Methyl-5-Bromo-4-Thiazolidinone

To a stirred solution of 20 g. (0.1 mole) 2-carbethoxymethylene-3-methyl-4-thiazolidinone in 120 ml. chloroform is added, dropwise, a solution of 5 ml. (0.1 mole) bromine in 20 ml. chloroform. The solvent is removed by distillation and the residue crystallized from methanol to yield 18 g. (65%) of 2-carbethoxymethylene-3-methyl-5-bromo-4-thiazolidinone, melting point 76° C.

EXAMPLE 2

2-Carbethoxymethylene-3-Methyl-5-Diethylamino-4-Thiazolidinone

To a solution of 28 g. (0.1 mole) 2-carbethoxymethylene-3-methyl-5-bromo-4-thiazolidinone prepared as described in Example 1 in 200 ml. benzene is added 14.5 g. (0.2 mole) diethylamine and the mixture is allowed to stand for 3 hours at 25° C. The resulting suspension is filtered to remove the precipitated diethylamine hydrobromide and the filtrate is evaporated to dryness. The residue is taken up in ether, filtered and the filtrate saturated with dry hydrogen chloride to yield 25 g. (83%) of the hydrochloride salt of 2-carbethoxymethylene-3-methyl-5-diethylamino-4-thiazolidinone, melting point 149–150° C., light-yellow crystals from absolute ethanol.

*Analysis.*—Calc.: C, 46.67; H, 6.85; N, 9.07; S, 10.38; Cl, 11.47. Found: C, 46.75; H, 7.07; N, 9.13; S, 10.13; Cl, 11.82.

By a similar procedure, 2-carbethoxymethylene-3-methyl-5-bromo-4-thiazolidinone is reacted with other amines to prepare the following compounds:

EXAMPLE 3

Reaction with pyrrolidine yields 2-carbethoxymethylene-3-methyl-5-pyrrolidino-4-thiazolidinone, melting point 123° C.

*Analysis.*—Calc.: C, 53.30; H, 6.71; N, 10.36; S, 11.86. Found: C, 53.30; H, 6.68; N, 10.45; S, 11.54.

EXAMPLE 4

Reaction with piperidine yields 2-carbethoxymethylene-3-methyl-5-piperidino-4-thiazolidinone. Melting point of the hydrochloride salt is 158–159° C.

*Analysis (of the hydrochloride).*—Calc.: C, 48.63; H, 6.59; N, 8.74; S, 10.00; Cl, 11.05. Found: C, 48.77; H, 6.60; N, 8.72; S, 9.93; Cl. 10.79.

EXAMPLE 5

Reaction with morpholine yields 2-carbethoxymethylene-3-methyl-5-morpholino-4-thiazolidinone, melting point 153° C.

*Analysis.*—Calc.: C, 50.32; H, 6.34; N, 9.78; S, 11.20. Found: C, 50.44; H, 6.33; N, 9.91; S, 10.98.

EXAMPLE 6

Reaction with 3-methylmorpholine yields 2-carbethoxymethyl-3-methyl-5-(3-methylmorpholino)-4-thiazolidinone, melting point 145° C.

*Analysis.*—Calc.: C, 51.98; H, 6.72; N, 9.33; S. 10.67. Found: C, 52.15; H, 6.62; N, 9.40; S, 10.29.

It will be understood that the method of the present invention is adaptable to the preparation of compounds embraced by the formula:

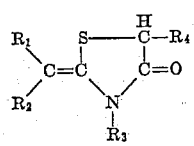

other than those specifically enumerated in the foregoing examples. For example, other 5-bromo derivatives may be used in the reaction, for example 2-(α-carbomethoxyethylidene)-3-ethyl-5-bromo-4-thiazolidinone, 2-(α-carbomethoxybenzylidene)-3-methyl-5-bromo-4-thiazolidinone, 2-(α-carbethoxyethylidene)-3-propyl-5-bromo-4-thiazolidinone and the like, as well as other amines, such as dimethylamine, dibutylamine, 2-methylpiperidine, 2-methylpyrrolidine, 2-ethylpiperidine, 3-ethylmorpholine, 2-methylmorpholine, 3-butylpyrrolidine and the like.

It is understood that the foregoing detailed description is given merely by way of illustration and that many variations may be made therein without departing from the spirit of my invention.

Having described my invention, what I desire to secure by Letters Patent is:

1. A compound of the formula:

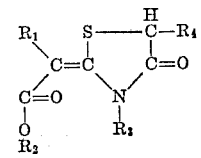

wherein $R_1$ is a member selected from the group consisting of hydrogen, lower alkyl and phenyl, $R_2$ is lower alkyl, $R_3$ is lower alkyl and $R_4$ is a member selected from the group consisting of di-lower alkylamino and a cyclic amino radical selected from the group consisting of piperidino, pyrrolidino, morpholino and mono-lower alkyl derivatives thereof.

2. 2 - carbethoxymethylene-3-methyl-5-diethylamino-4-thiazolidinone.

3. 2 - carbethoxymethylene - 3 - methyl- 5 -pyrrolidino-4-thiazolidinone.

4. 2 - carbethoxymethylene - 3-methyl-5-piperidino-4-thiazolidinone.

5. 2-carbethoxymethylene - 3 - methyl-5-morpholino-4-thiazolidinone.

6. 2 - carbethoxymethylene - 3 - methyl-5-(3-methylmorpholino)-4-thiazolidinone.

7. A compound of the formula:

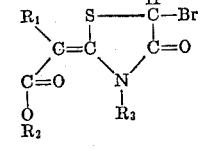

wherein $R_1$ is a member selected from the group consisting of hydrogen, lower alkyl and phenyl, $R_2$ is lower alkyl and $R_3$ is lower alkyl.

8. 2 - carbethoxymethylene - 3 - methyl - 5 - bromo - 4 - thiazolidinone.

9. A method of preparing compounds of the formula:

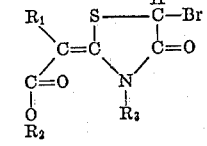

wherein $R_1$ is a member selected from the group consisting of hydrogen, lower alkyl and phenyl, $R_2$ is lower alkyl and $R_3$ is lower alkyl, which comprises treating a solution in an inert solvent of a compound of the formula:

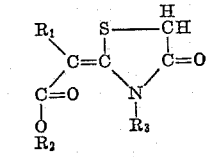

with bromine.

10. A method according to claim 9 wherein said inert solvent is chloroform and the reaction is carried out at a temperature of about 25° C.

11. A method of preparing compounds of the formula:

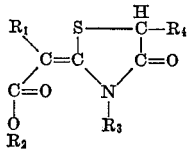

wherein $R_1$ is a member selected from the group consisting of hydrogen, lower alkyl and phenyl, $R_2$ is lower alkyl, $R_3$ is lower alkyl and $R_4$ is a member selected from the group consisting of di-lower alkylamino and a cyclic amino radical selected from the group consisting of piperidino, pyrrolidino, morpholino and mono-lower alkyl derivatives thereof, which comprises treating a solution in an inert solvent of a compound of the formula:

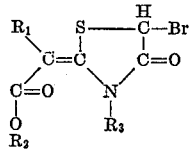

with an amine of the formula $R_4$—H.

12. A method according to claim 11 wherein said inert solvent is benzene and the reaction is carried out at a temperature of about 25° C.

No references cited.